(12) United States Patent
Hajare et al.

(10) Patent No.: US 8,805,777 B2
(45) Date of Patent: Aug. 12, 2014

(54) DATA RECORD COLLAPSE AND SPLIT FUNCTIONALITY

(75) Inventors: Sidhu G. Hajare, Rahatni (IN); Ankur B. Shah, Nanavat (IN)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 13/446,299

(22) Filed: Apr. 13, 2012

(65) Prior Publication Data

US 2013/0275369 A1 Oct. 17, 2013

(51) Int. Cl.
*G06F 17/00* (2006.01)
*G06F 7/00* (2006.01)

(52) U.S. Cl.
USPC ........................................................ 707/609

(58) Field of Classification Search
USPC ........................................................ 707/616
See application file for complete search history.

(56) References Cited

U.S. PATENT DOCUMENTS

| | | | |
|---|---|---|---|
| 7,685,090 B2 | 3/2010 | Chaudhuri et al. | |
| 7,716,203 B2 | 5/2010 | Chouinard et al. | |
| 7,769,726 B2 | 8/2010 | Gitai et al. | |
| 8,055,609 B2 | 11/2011 | Chen et al. | |
| 8,060,442 B1 | 11/2011 | Hecht et al. | |
| 2004/0249789 A1 | 12/2004 | Kapoor et al. | |
| 2005/0154615 A1* | 7/2005 | Rotter et al. | 705/3 |
| 2009/0024589 A1* | 1/2009 | Sood et al. | 707/3 |
| 2009/0063456 A1 | 3/2009 | Chouinard et al. | |
| 2009/0228428 A1 | 9/2009 | Dan et al. | |
| 2009/0313568 A1 | 12/2009 | Mackintosh et al. | |
| 2010/0211413 A1* | 8/2010 | Tholl et al. | 705/4 |
| 2010/0250620 A1 | 9/2010 | Maier et al. | |
| 2011/0087632 A1 | 4/2011 | Subramanian et al. | |
| 2011/0137864 A1 | 6/2011 | Deshmukh et al. | |

OTHER PUBLICATIONS

A merging System for Integrated Person-Centric Information Systems written by Swati Jain, Aug. 8, 2011.*
Adrian Gregory, Data Governance—Protecting and Unleashing the Value of Your Customer Data Assets, Journal of Direct, Data and Digital Marketing Practice, vol. 12, No. 3, pp. 230-248, Nov. 2010.
Przemyslaw Pawluk, Trusted Data in IBM's MDM: Accuracy Dimension, Proceedings of the International Multiconference on Computer Science and Information Technology, pp. 577-584, 2010.

* cited by examiner

*Primary Examiner* — Robert Beausoliel, Jr.
*Assistant Examiner* — Hau H Hoang
(74) *Attorney, Agent, or Firm* — Ronald A. Kaschak, Esq.; Matthew M. Hulihan, Esq.; Heslin Rothenberg Farley & Mesiti P.C.

(57) ABSTRACT

Management of data records corresponding to duplicate entities is provided, in which multiple data records are collapsed into a master data record for an entity. Attributes of the multiple data records which are to be included in the master data record for the entity are determined and a source data record is selected from the multiple data records to become the master data record. At least one remaining data record is a candidate data record to be collapsed into the master data record. The selected source data record is updated with the determined attributes to form the master data record. The selected source data record remains active in its database and becomes the master data record in response to the updating, and the at least one candidate data record is deactivated.

20 Claims, 7 Drawing Sheets

DATA RECORD COLLAPSE AND SPLIT FUNCTIONALITY

BACKGROUND

Customer records and other information that are often a part of complex data systems and business applications present a variety of challenges in management, identification, analysis and segregation, for example. Information often exists in multiple locations within an organization, within an enterprise, or even more globally across enterprises. Furthermore, information is often represented in an optimal way for local applications, and, usually, not all applications within the organization, enterprise, or globally across enterprises require, use, or are allowed to access all of the information that exists. As a result, the amount of unstructured data that may reside in planned and developing databases could easily become out of hand, causing storage and processing inefficiencies. With such an amount of unstructured data, additional complexities arise, especially when the data is present on different platforms, is of varying freshness, and may be inconsistent or duplicative across the platforms.

Within a complex data system, where there exists multiple databases each having records comprising particular data, determining duplicate or related records can be particularly difficult. Quality issues also arise in which data stewardship matters become a central concern. Further, in customer relationship management (CRM) matters, which often necessitate data integrity to realize optimal returns on data structure investments, removing "bad customer data" and especially duplicate customer data is of key concern.

BRIEF SUMMARY

The shortcomings of the prior art are overcome and additional advantages are provided through the provision of a method for facilitating data record management. The method includes, for instance, collapsing two or more data records into a master data record for an entity, the two or more data records stored in at least one database, and the collapsing including determining attributes of the two or more data records which are to be included in the master data record for the entity, selecting a source data record from the two or more data records to become the master data record for the entity, at least one remaining data record of the two or more data records including at least one candidate data record to be collapsed into the master data record, updating the selected source data record with the determined attributes to form the master data record, wherein the selected source data record remains active in a database of the at least one database and becomes the master data record in response to the updating, and deactivating, in the at least one database, the at least one candidate data record.

In another aspect, a computer system is provided for facilitating data record management. The computer system includes a memory and a processor, in communications with the memory, and the computer system is configured to perform collapsing two or more data records into a master data record for an entity, the two or more data records stored in at least one database, and the collapsing including determining attributes of the two or more data records which are to be included in the master data record for the entity, selecting a source data record from the two or more data records to become the master data record for the entity, at least one remaining data record of the two or more data records including at least one candidate data record to be collapsed into the master data record, updating the selected source data record with the determined attributes to form the master data record, wherein the selected source data record remains active in a database of the at least one database and becomes the master data record in response to the updating, and deactivating, in the at least one database, the at least one candidate data record.

In a further aspect, a computer program product is provided for facilitating data record management. The computer program product includes a non-transitory storage medium readable by a processor and storing instructions for execution by the processor to perform a method including collapsing two or more data records into a master data record for an entity, the two or more data records stored in at least one database, and the collapsing including determining attributes of the two or more data records which are to be included in the master data record for the entity, selecting a source data record from the two or more data records to become the master data record for the entity, at least one remaining data record of the two or more data records including at least one candidate data record to be collapsed into the master data record, updating, by the processor, the selected source data record with the determined attributes to form the master data record, wherein the selected source data record remains active in a database of the at least one database and becomes the master data record in response to the updating, and deactivating, in the at least one database, the at least one candidate data record.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

The IBM InfoSphere® Master Data Management (MDM) solution is a real-time, service-oriented customer application (InfoSphere® is a registered trademark of International Business Machines Corporation, Armonk, N.Y.). MDM provides users with a single view of the customer (or other entity) and also with business processes which provide for maintaining entity data shared between multiple data sources, such as those in a front and back office arrangement. It is used to create a unified and consistent view of enterprise-wide data and also to make data available to all appropriate external systems. The MDM technology receives data and information from multiple external systems and typically provides various mechanisms for handling real-time or near-real-time data synchronization with the external systems, including provision of a single master-view (also referred to as a 360 degree view, or a 'golden' copy or record) of data for an entity.

The MDM manages business rules, event detection, data validation and suspect duplicate processing (SDP), as examples. SDP provides search for, and matching of, duplicate entities in one or more databases. An entity can vary in meaning, depending on the context. For instance, an entity could be a person or establishment such as an employee, customer, or organization, or a tangible item such as products or other asset. Entity data is represented by data records stored in the one or more databases. Multiple data records could exist for a single entity. SDP identifies suspect entities, i.e. data records that are identified as being potentially for a same entity as another entity, by comparing critical data elements of data records. Suspects are typically identified after a source data record (corresponding to a 'source entity') is presented/selected. SDP identifies potentially duplicate entities for possible collapse with the source entity. SDP creates a suspect table with candidate suspect duplicate entities as part of the process. In one example, values determined by the SDP in this process are then assessed to determine similarity or dissimilarity as between the source and candidate suspects.

Once a list of suspect entities is determined, and assuming a sufficient similarity exists between the source data record and one or more suspect data records (indicating they are for the same entity), collapse processing provided by MDM enables a user to collapse the similar data records to form a master ('golden') data record which provides the 360 degree view of the entity. SDP and collapse processing therefore provide a method to maintain a single and accurate record of an entity across a set of databases, such as those associated with an organization or enterprise.

Figure 1:
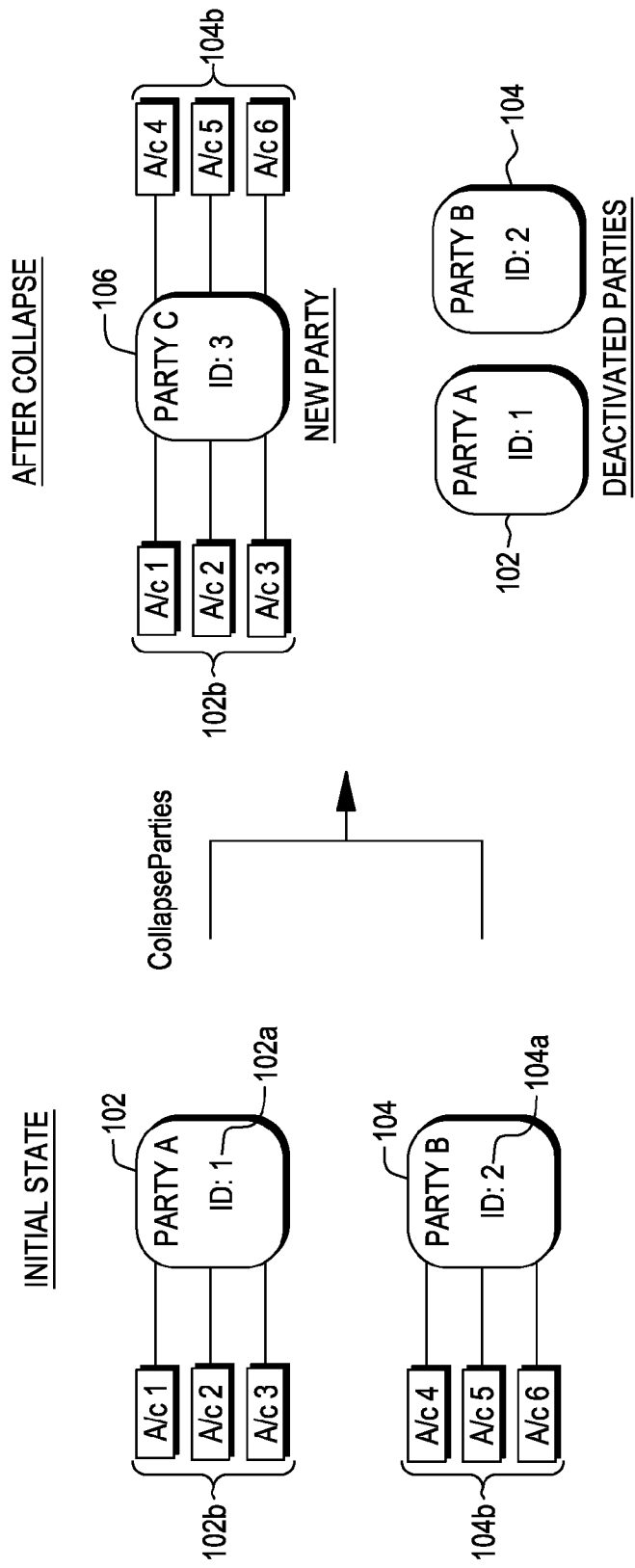
FIG. 1 depicts one example of a collapse of two data records into a newly formed master data record.

FIG. 1 depicts one example of a collapse of two data records into a newly formed master data record. In an initial state, data record 102 for Party A and data record 104 for Party B are stored in one or more databases and have been identified for merging. In one example, Party A is a source party selected for suspect processing, and Party B was found to be a candidate suspect for potential collapse with Party A. Data records 102 and 104 each have their own unique identifier 102a and 104a, respectively, used for uniquely identifying the data record in the database(s). Additionally, data records 102 and 104 each have their own associated attributes, that is, data record 102 has included with it attributes 102b, and data record 104 has included within it attributes 104b. An attribute can be virtually anything that can be associated with an entity. In the case of a customer entity type, for instance, attributes can include data about the customer, such as the name, address, and contact information, as well as information linking the customer to contracts between the customer and an organization that maintains/utilizes the database(s) storing data records about its customers, such as orders or transactions that the customer has placed with the organization.

If Party A and Party B are determined to be the same entity (for instance based on overlap in attributes included in the source and suspect data records, or based on examination by a user), data records 102, 104 for the entity may be collapsed to form a master data record, thereby merging critical data into a single, easier-to-handle data structure representing the entity. Thus, as depicted in FIG. 1, a CollapseParties process (i.e. set of operations) creates an additional data record 106. Additional data record 106 is identified by Party C, (which will become the identifying Party for the entity), and, because data record 106 is newly created, it is given a new unique identifier 106a. Data records 102 and 104 are then collapsed into master data record 106. More specifically, critical information in the form of attributes, identified, in one example, by a user comparing attributes of data records 102 and 104, is copied into data record 106, and data records 102 and 104 are deactivated. In this example, data record 106 is updated with attributes 102b and 104b, which were attributes of data records 102 and 104, and data records 102 and 104 are deactivated to render the data records inactive in the one or more databases.

As described and depicted with reference to FIG. 1, a master data record for the entity is created and multiple (in this case, two) data records are collapsed into the additional data record for the entity. While the collapse as described above facilitates provision of a single representation of the entity, it has drawbacks. For instance, all data records being collapsed (source and suspect data records) become deactivated. An attempt to obtain or modify data of the original source data record will therefore fail, since it is deactivated. Some customers do not want these features as they want to keep and maintain the old data of the entity.

Another drawback exists in the amount of storage space consumed. Deactivated records remain in the database(s) and will not be reactivated. For instance, if the master data record is later split and deactivated in order to undo the collapse, additional new records (in the above example, two of them) are created, and the attributes are added to the additional records. This leads to consumption of excessive storage space. Using the above example, after the collapse operation, three data records exist—two deactivated (102, 104) and one, the master 106, which is active. If the master data record is subsequently split to revert to the two separate data records, it is deactivated, two new data records are created, and attributes 102b and 104b are each added to one of the new records to reconstruct the old (deactivated) data records. The result is that five data records—three inactive (102, 104, 106) and two active (the two new records)—exist in the databases. Thus, in the collapse and split of just two existing data records, three data records will remain inactive and two will remain active. This can lead to tremendous issues with storage consumption and data record management when scaled to millions of data records for thousands or millions of clients.

In accordance with aspects of the present invention, an enhanced collapse technique is provided in which suspect data records are merged into an existing (i.e. source) data record to form the master data record. Should the master data record later be split, the inactivated suspect data records are reactivated and the master data record is updated to include its prior attributes. No additional records are created as a result of the collapse or the split.

Figure 2:
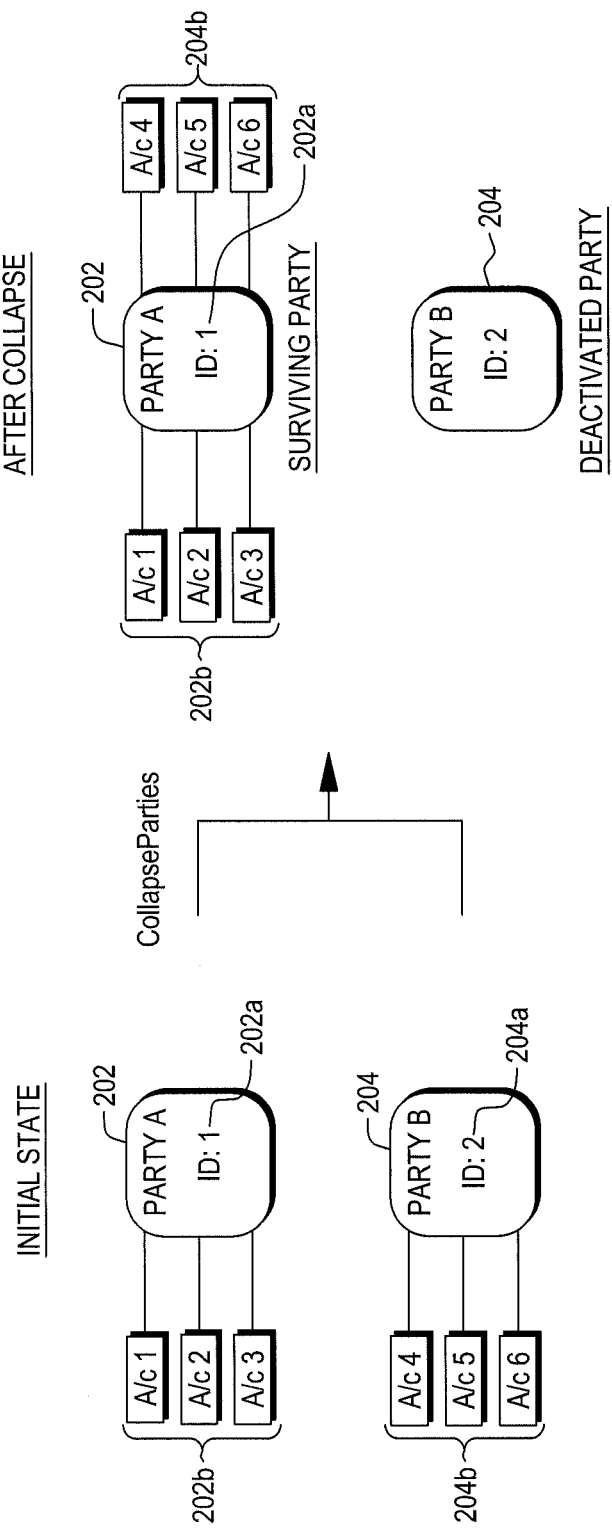
FIG. 2 depicts an example of collapsing two data records into a master data record, in accordance with one or more aspects of the present invention.

FIG. 2 depicts an example of an enhanced collapse of two data records into a master data record, in accordance with one or more aspects of the present invention.

In FIG. 2, data record 202 for Party A and 204 for Party B have associated unique identifiers 202a and 204a, respectively, as well as attributes 202b and 204b, respectively. In accordance with an aspect of the present invention, data record 202 and 204 are collapsed into a master data record, and more specifically, attributes of data records 202 and 204 are collapsed into data record 202 which becomes the master data record. Thus, attributes 204b, as a result of the collapse, become associated with record 202 for Party A, which carries on with unique identifier 202a. Meanwhile, data record 204 is deactivated to render data record 204 inactive in the one or more databases.

In this manner, Party A (data record 202) survives and becomes the master data record, into which all of the records (202 and candidate suspect 204) are collapsed. Party A therefore becomes the 'golden copy' for Parties A and B. In one example, the data record having the most recent update to its attribute(s) is the source party into which the other parties are collapsed. In cases where multiple candidate data records are to be collapsed into a single source data record to form the master data record, the appropriate attributes of each candidate data record can be added to the source data record, and each candidate data record can be deactivated.

Figure 3:
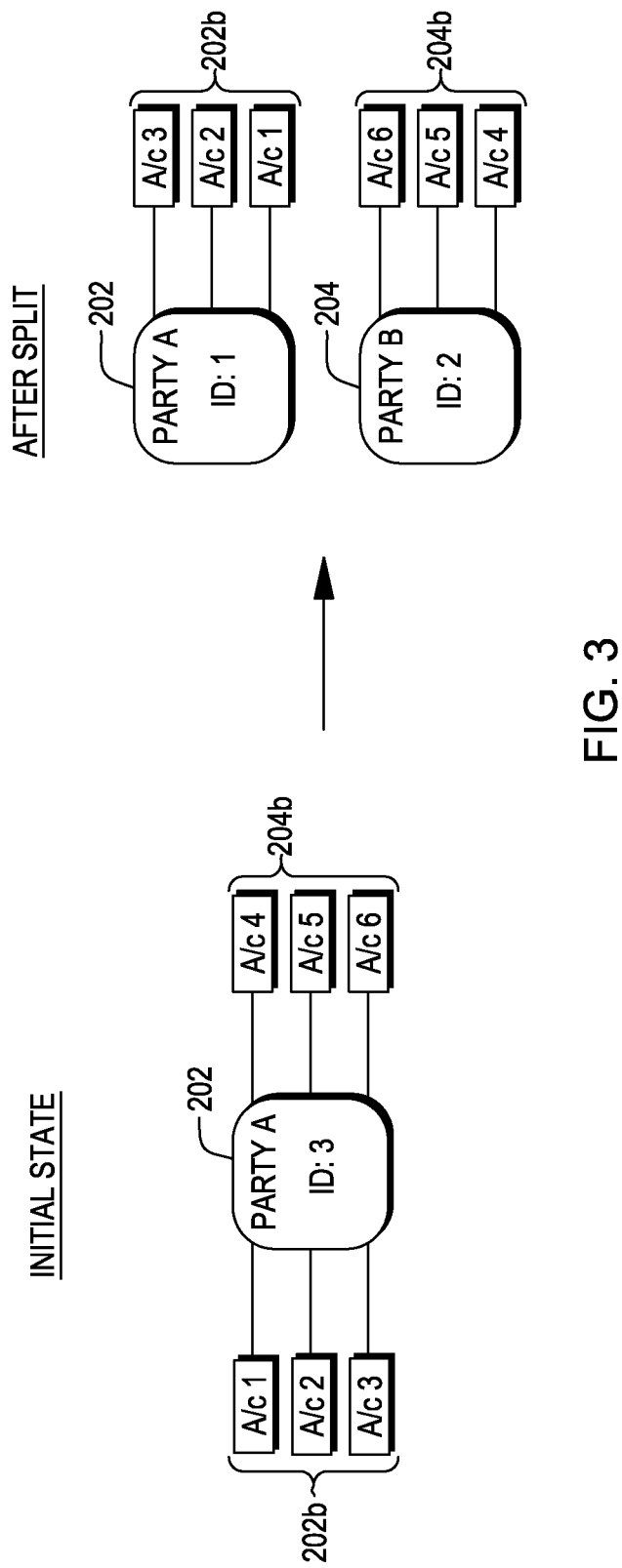
FIG. 3 depicts one example of splitting a master data record, in accordance with one or more aspects of the present invention.

An enhanced split technique is also provided, in which the master data record can be split in order to undo the collapse of the source and candidate data records. In this scenario, the old (deactivated suspect) records are reactivated, and the attributes of the old data records that were added to the master data record during the collapse are removed from the master data record, to effectively update the source data record with its prior attributes. FIG. 3 depicts one example of splitting a master data record, in accordance with one or more aspects of the present invention.

In an initial state master data record 202, having attributes 202b and 204b included in it, is split. Data record 204 is reactivated, and attributes 204b are removed from master data record 202. If attributes 204b were removed from record 204 when it was deactivated during the collapse, then attributes 204b are added back with data record 204 when it is reactivated during the split. Otherwise, attributes 204b were not previously removed from data record 204 and all that is needed is the reactivation of data record 204. Data record 202, as a result, has been reverted back to having its prior attributes (202b) and data record 204 has been reactivated. The collapse operation is therefore undone, with no extraneous data records remaining inactive in the database(s).

Figure 4:
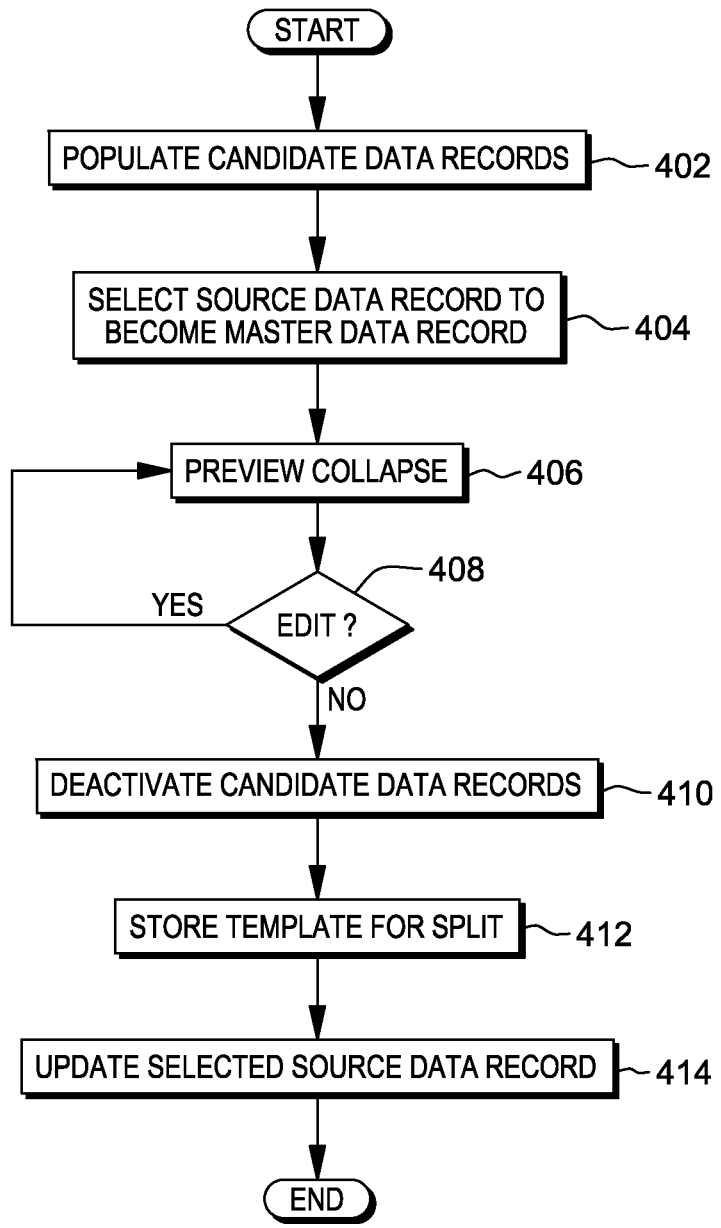
FIG. 4 depicts one example of a collapse process, in accordance with one or more aspects of the present invention.

Further details of the enhanced collapse and split processes are now provided. FIG. 4 depicts one example of a collapse process, in accordance with one or more aspects of the present invention. The process begins by populating candidate data records (402). In one example, this occurs using an existing duplicate data record identification facility of a software program for managing data records, such as the Suspect Duplicate Processing facility of the Master Data Management software described above. Next, a source data record that will become the master data record is selected (404). In one example, this is selected responsive to an indication provided by a user, such as an identification by the user of which data record is to be the source data record into which the other candidate data records are to be collapsed. In another example, the selected source data record is selected automatically based on that record including the most pertinent attributes for the entity.

After a source data record is selected, a set of attributes for the master data record may be determined and presented are part of a preview of the collapse (406) of the candidate data record(s) into the selected source data record. The preview includes a display of the master data record with its included attributes. The preview, in one embodiment, is provided through an included facility in the software program for managing data records. In one example, the determined attributes are initially determined automatically, and include those from the selected source data record and the candidate data records, with duplicate or redundant attributes removed. For instance, if two records both have an attribute indicating the entity's address, and it is the same address, only one of those attributes will be included in the preview of the master data record.

It is then determined whether the preview is edited (408). In one example, the set of attributes or other aspects of the previewed collapse may be modified by a user using a graphical user interface displaying the available attributes (from the populated candidate records) for potential inclusion in the master data record. Alternatively, a user may wish to modify properties or data of an attribute to be included in the master data record. If the preview is edited, it will be updated accordingly.

In one example, the preview of the collapse defines a template of the changes to be made to the data records involved in the collapse. For instance, it indicates the attributes of the source data record (prior to the collapse), the attributes to be added to the source data record, and the candidate data records that will be deactivated as a result of the collapse. The template facilitates a subsequent split of the master data record back into the source and candidate data records, should it be requested, as described in further detail below.

Once editing has completed (or if no edits were made), candidate data records are deactivated (410). In one example, this includes adding an indication (such as the unique identifier) of each candidate data record deactivated to a deactivated data records table. Next, the template is stored (412) in, for instance, a database, to facilitate a possible later split of the master data record into the source and suspect parties that were collapsed. Finally, the selected source data record is updated with the determined attributes to form the master data record (414). As a result of the collapse, all data records involved in the collapse (save for the surviving source data record) are deactivated, and the source data record survives as the master data record.

In a particular example in which one or more of the attributes to be added to the master data record comprise information linking the entity to a contract, deactivating the candidate data records includes disassociating the contract from the appropriate candidate data record (the candidate record with which the contract is currently associated) and updating the selected source data record includes associating the contract with the source data record, to associated the contract with the source data record.

After the collapse occurs, the candidate suspect data record(s) that were collapsed into the source data record are deactivated and the selected source data record remains active as the master data record, having associated therewith the appropriate attributes of the entity.

Figure 5:
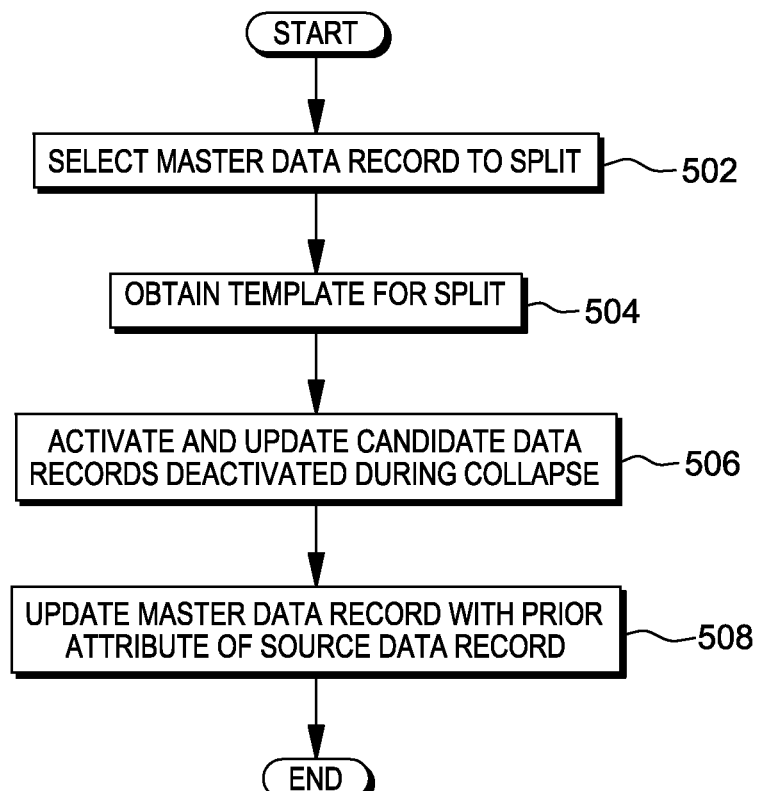
FIG. 5 depicts one example of a split process, in accordance with one or more aspects of the present invention.

For various reasons, it may be desired to split the master data record back into the source and candidate suspect data records which were collapsed to form the master data record. For instance, perhaps the master data record was mistakenly created or data records that were not actually duplicates for an entity were mistakenly included in a collapse into a master data record. FIG. 5 depicts one example of a split process, in accordance with one or more aspects of the present invention. The split process is implemented, in one example, in a service added to the software for managing data records. Advantageously, the split process of FIG. 5 enables a split of the master data record to uncollapse the source and candidate data records absent creation of additional data records.

The split process begins by selecting a master data record to split (502). This may be selected responsive to an indication provided by a user that the master data record is to be split. Next, the template that was saved during the collapse to form the master data record is obtained (504). The template provides the necessary information for updating the master data record to have the prior attributes included with the selected source record which became the master data records and for reactivating the candidate suspect data records that were deactivated during the collapse. The candidate data records are reactivated (and if necessary updated with the attributes previously included in them) (506). In one example, the candidate data records are reactivated by removing the indication of each candidate data record being reactivated from the deactivated data records table. Further, the master data record is updated with the prior attributes of the source data record (508). In one example, if the master data record was updated with attributes after the collapse (i.e. new attributes added or existing attributes updated), the prior attributes of the master data record (i.e. the attributes of the source data record prior to collapse) remain with the master data record during the split, and the updated attributes also remain included in the master data record during the split, so that the source data record after the split will include both its prior attributes as well as the updated attributes added after the collapse. In an alternative embodiment, the attributes updated after the collapse are added to various of the reactivated candidate data records, and selected automatically or by a user, in one example. In yet another example, the updated attributes are discarded or reverted back to their pre-collapse state during the split.

Further, using the example above in which a contract was disassociated from a candidate data record and associated with the master data record during the collapse, the updating the master data record includes disassociating the contract with the master data record and the reactivating the candidate record includes reassociating the contract with the candidate data record being reactivated.

In one example, it may be desirable for the organization maintaining/using the data records to make modifications to the deactivated records. In the above collapse and split protocol, a collapsed data record will be reactivated if the master data record into which the deactivated record was collapsed is later split. Thus, it may be desirable for the organization to continue making updates to the deactivated data record so that, should the record later become reactivated, it is already up-to-date.

Described above are enhanced collapse and split techniques to facilitate data record management. The above techniques advantageously reduce the number of deactivations during a collapse and during a split, while reducing the amount of storage consumed by deactivated data records. The source party of a collapse is maintained and becomes the master data record, retaining the unique identifier of the source party (rather than, for instance, creating a new data record with a new unique identifier). References by applications, or other downstream systems accessing the database, to the original source party will remain valid and return the master data record.

Furthermore, an efficient split of the master data record is provided, in which old records are reactivated and the master data record is modified by removing from it the attributes that became associated with the master data record during the collapse. The resulting reduction in workload provides an easy to maintain set of data records across one or more databases.

Additionally, a source system fetching/updating data from, for instance, a Master Data Management application, to fetch/update data of a requested, but deactivated, party in the database (e.g. deactivated record 204 for party B in FIG. 2) can be handled programmatically in that it can return the master data record (206) for that party and optionally indicate at least one of the status of the deactivated record (204) as being deactivated and the status of record 206 as being the master data record for the requested (but deactivated) party B.

Figure 6:
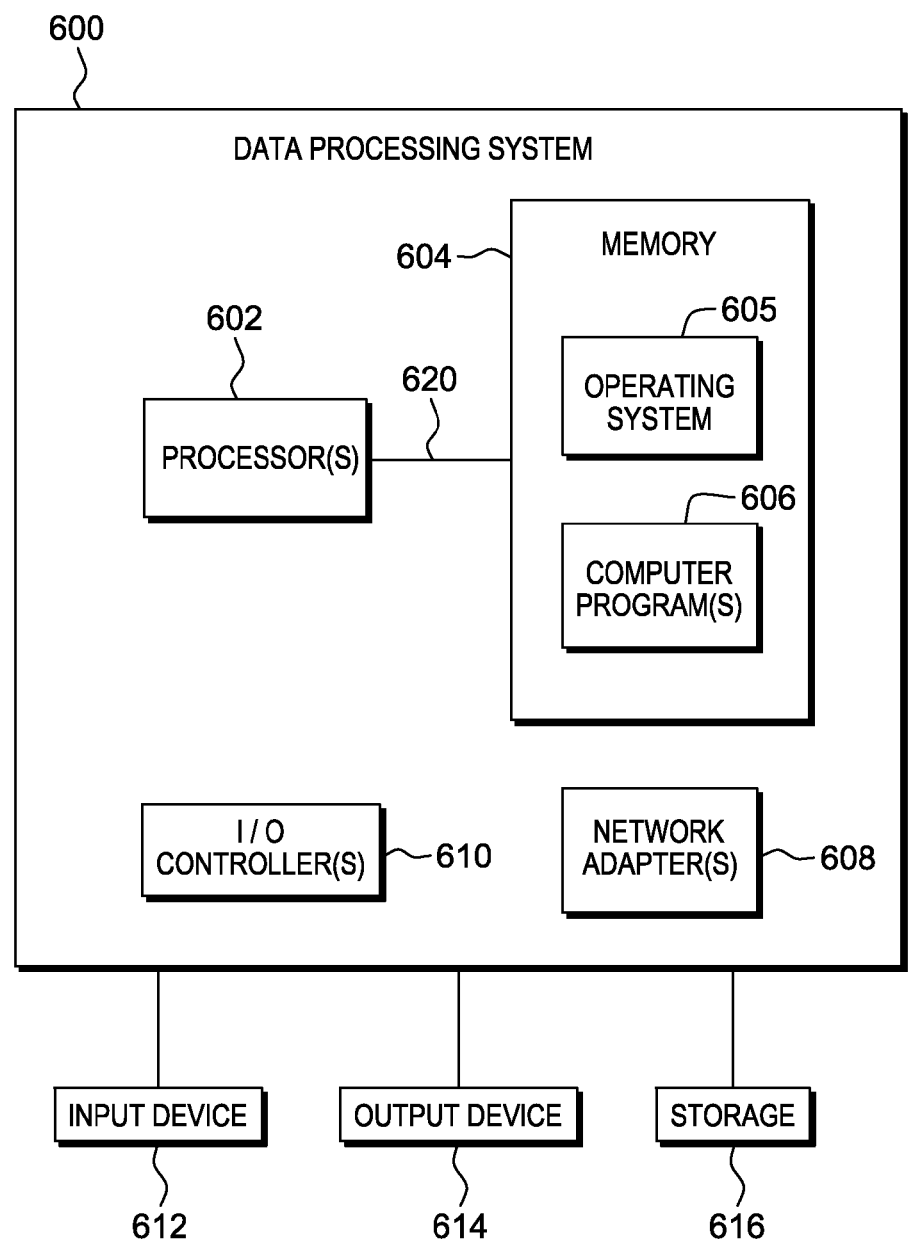
FIG. 6 depicts one example of a data processing system to incorporate and use one or more aspects of the present invention.

FIG. 6 illustrates a data processing system 600 that may be used in accordance with certain embodiments of the present invention. In one embodiment, data processing system 600 may be based, for instance, on Intel Corporation's x86 architecture, or the xSeries® or pSeries® architectures offered by International Business Machines Corporation, Armonk, N.Y. (xSeries® and pSeries® are registered trademarks of International Business Machines Corporation, Armonk, N.Y.).

Data processing system 600 is suitable for storing and/or executing program code and includes at least one processor 602 coupled directly or indirectly to memory 604 through a system bus 620. Memory 604 may include local memory employed during actual execution of the program code, bulk storage, and cache memories which provide temporary storage of at least some program code in order to reduce the number of times code must be retrieved from bulk storage during execution. A non-limiting list of examples of memory 604 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 604 includes an operating system 605 and one or more computer programs 606, such as a software program for data management. Processor(s) 602 obtain from memory 604 one or more instructions for execution by the processors.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

Data processing system 600 may be coupled to storage 616 (e.g., a non-volatile storage area, such as magnetic disk drives, optical disk drives, a tape drive, etc.), having one or more databases. Storage 616 may comprise an internal storage device or an attached or network accessible storage. Computer programs in storage 616 may be loaded into memory 604 and executed by a processor 602 in a manner known in the art.

The data processing system 600 may include fewer components than illustrated, additional components not illustrated herein, or some combination of the components illustrated and additional components. Data processing system 600 may comprise any computing device known in the art, such as a mainframe, server, personal computer, workstation, laptop, handheld computer, telephony device, network appliance, virtualization device, storage controller, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 7:
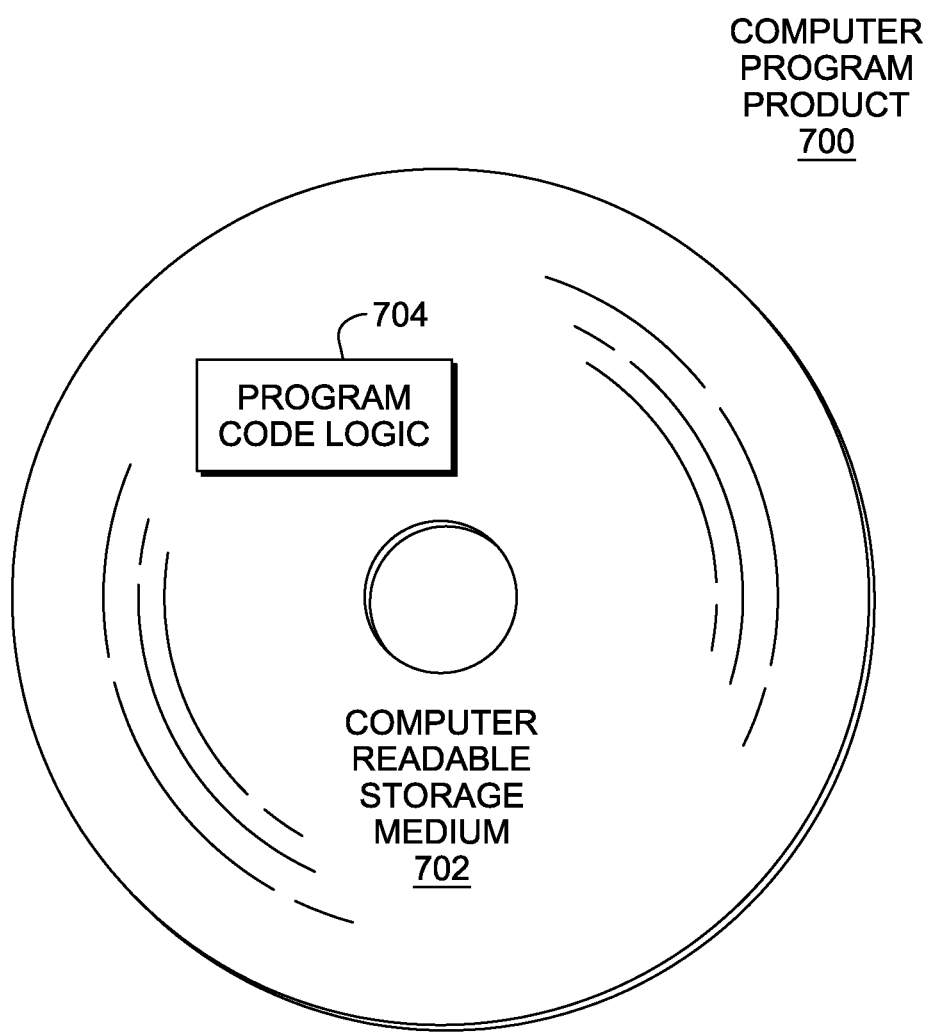
FIG. 7 depicts one embodiment of a computer program product, in accordance with one or more aspects of the present invention.

Referring now to FIG. 7, in one example, a computer program product 700 includes, for instance, one or more computer readable media 702 to store computer readable program code means or logic 704 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method to facilitate data record management, the method comprising:
    collapsing two or more data records into a master data record for an entity, the two or more data records stored in at least one database, and the collapsing comprising:
        determining attributes of the two or more data records which are to be included in the master data record for the entity;
        selecting a source data record from the two or more data records to become the master data record for the entity, at least one remaining data record of the two or more data records comprising at least one candidate data record to be collapsed into the master data record;
        updating, by a processor, the selected source data record with the determined attributes to form the master data record, wherein the updating associates at least one attribute of a candidate data record of the at least one candidate data record with the source data record, the source data record having an original set of one or more attributes, and wherein the selected source data record remains active in a database of the at least one database and becomes the master data record in response to the updating;
        deactivating, in the at least one database, the at least one candidate data record and
        maintaining the deactivated at least one candidate data record in the at least one database for potential reactivation thereof during a subsequent split of the master data record in which the master data record is to survive as the source data record with the original attributes and the deactivated at least one candidate data record is to be reactivated.

2. The method of claim 1, wherein the determined attributes comprise at least one attribute of the selected source data record and the at least one attribute of the candidate data record.

3. The method of claim 1, wherein updating the source data record facilitates collapse of the two or more data records into the master data record absent creation of an additional data record for the master data record, to facilitate minimizing storage consumed in the at least one database.

4. The method of claim 1, wherein the entity comprises a customer, and wherein updating the selected source data record comprises:
    associating with the selected source data record a contract for the customer, the contract associated with a candidate data record of the at least one candidate data record, and the associating comprising adding to the source data record an attribute comprising information linking the customer to the contract; and
    disassociating with the candidate data record the contract for the customer by removing, from the candidate data record, an attribute comprising the information linking the customer to the contract.

5. The method of claim 1, wherein deactivating the at least one candidate data record comprises adding at least one indication of the at least one candidate data record to a deactivated data records table.

6. The method of claim 1, further comprising storing a template indicating one or more attributes of the selected source data record prior to the collapse, wherein the template facilitates splitting the master data record to revert the master data record back to the source data record with the original set of attributes.

7. The method of claim 1, further comprising splitting the master data record, the splitting comprising:
    modifying one or more attributes of the master data record to revert the master data record back to the source data record with the original set of attributes prior to the collapse, wherein an attribute, of a candidate data record of the at least one candidate data record, that was associated with the source data record by the updating of the source data record to form the master data record is disassociated with the master data record; and
    reactivating the deactivated at least one candidate data record, wherein the attribute that was associated with the source data record by the updating is reassociated with the candidate data record and the master data record survives as the source data record with at least the original attributes.

8. The method of claim 7, wherein the modifying and the reactivating facilitate undoing the collapse absent creation of an additional data record, to facilitate minimizing storage consumed in the at least one database.

9. The method of claim 7, wherein the entity comprises a customer, wherein the attribute disassociated with the master data record comprises information linking the customer to a contract for the customer, the contract being previously associated with the candidate data record prior to the collapse, wherein disassociating the attribute with the master data record disassociates the contract for the customer from the master data record by removing from the master data record the attribute comprising the information linking the customer to the contract, and wherein reactivating the deactivated at least one candidate data record comprises reassociating the contract for the customer with the candidate data record by reassociating, with the candidate data record, the attribute that was associated with the source data record by the updating.

10. The method of claim 7, wherein reactivating the at least one candidate data record comprises removing at least one indication of the at least one candidate data record from a deactivated data records table.

11. The method of claim 1, further comprising presenting to a user a preview of the collapse of the two or more data records into the master data record, the preview defining a template of changes made to the two or more data records by the collapse and identifying (i) the original set of attributes of the source data record, (ii) one or more attributes, of the at least one candidate data record, to be added to the source data record, and (iii) at least one candidate data record that are to be deactivated as a result of the collapse, wherein the template is maintained to facilitate splitting the master data record and reactivating the deactivated at least one candidate date record based on the indicated original set of attributes, the one or more attributes to be added to the source data record, and the at least one candidate data record that are to be deactivated as a result of the collapse.

12. A computer system for facilitating data record management, the computer system comprising:
   a memory; and
   a processor, in communications with the memory, wherein the computer system is configured to perform:
      collapsing two or more data records into a master data record for an entity, the two or more data records stored in at least one database, and the collapsing comprising:
         determining attributes of the two or more data records which are to be included in the master data record for the entity;
         selecting a source data record from the two or more data records to become the master data record for the entity, at least one remaining data record of the two or more data records comprising at least one candidate data record to be collapsed into the master data record;
         updating the selected source data record with the determined attributes to form the master data record, wherein the updating associates at least one attribute of a candidate data record of the at least one candidate data record with the source data record, the source data record having an original set of one or more attributes, and wherein the selected source data record remains active in a database of the at least one database and becomes the master data record in response to the updating;
         deactivating, in the at least one database, the at least one candidate data record; and
         maintaining the deactivated at least one candidate data record in the at least one database for potential reactivation thereof during a subsequent split of the master data record in which the master data record is to survive as the source data record with the original attributes and the deactivated at least one candidate data record is to be reactivated.

13. The computer system of claim 12, wherein updating the source data record facilitates collapse of the two or more data records into the master data record absent creation of an additional data record for the master data record, to facilitate minimizing storage consumed in the at least one database.

14. The computer system of claim 12, wherein the computer system is further configured to perform storing a template indicating one or more attributes of the selected source data record prior to the collapse, wherein the template facilitates splitting the master data record to revert the master data record back to the source data record with the original set of attributes.

15. The computer system of claim 12, wherein the computer system is further configured to perform splitting the master data record, the splitting comprising:
   modifying one or more attributes of the master data record to revert the master data record back to the source data record with the original set of attributes prior to the collapse, wherein an attribute, of a candidate data record of the at least one candidate data record, that was associated with the source data record by the updating of the source data record to form the master data record is disassociated with the master data record; and
   reactivating the deactivated at least one candidate data record, wherein the attribute that was associated with the source data record by the updating is reassociated with the candidate data record and the master data record survives as the source data record with at least the original attributes.

16. The method of claim 15, wherein the modifying and the reactivating facilitate undoing the collapse absent creation of an additional data record, to facilitate minimizing storage consumed in the at least one database.

17. A computer program product for facilitating data record management, the computer program product comprising:
   a non-transitory storage medium readable by a processor and storing instructions for execution by the processor to perform a method comprising:
      collapsing two or more data records into a master data record for an entity, the two or more data records stored in at least one database, and the collapsing comprising:
         determining attributes of the two or more data records which are to be included in the master data record for the entity;
         selecting a source data record from the two or more data records to become the master data record for the entity, at least one remaining data record of the two or more data records comprising at least one candidate data record to be collapsed into the master data record;
         updating, by the processor, the selected source data record with the determined attributes to form the master data record, wherein the updating associates at least one attribute of a candidate data record of the at least one candidate data record with the source data record, the source data record having an original set of one or more attributes, and wherein the selected source data record remains active in a database of the at least one database and becomes the master data record in response to the updating;
         deactivating, in the at least one database, the at least one candidate data record; and
         maintaining the deactivated at least one candidate data record in the at least one database for potential reactivation thereof during a subsequent split of the master data record in which the master data record is to survive as the source data record with the original attributes and the deactivated at least one candidate data record is to be reactivated.

18. The computer program product of claim 17, wherein updating the source data record facilitates collapse of the two or more data records into the master data record absent creation of an additional data record for the master data record, to facilitate minimizing storage consumed in the at least one database.

19. The computer program product of claim 17, wherein the method further comprises splitting the master data record, the splitting comprising:
   modifying one or more attributes of the master data record to revert the master data record back to the source data record with the original set of attributes prior to the collapse, wherein an attribute, of a candidate data record of the at least one candidate data record, that was associated with the source data record by the updating of the source data record to form the master data record is disassociated with the master data record; and
   reactivating the deactivated at least one candidate data record, wherein the attribute that was associated with the source data record by the updating is reassociated with the candidate data record and the master data record survives as the source data record with al least the original attributes.

20. The computer program product of claim 19, wherein the modifying and the reactivating facilitate undoing the collapse absent creation of an additional data record, to facilitate minimizing storage consumed in the at least one database.

* * * * *